United States Patent [19]
Bundgardt

[11] Patent Number: 5,835,852
[45] Date of Patent: Nov. 10, 1998

[54] INTEGATED ELECTRONIC COMMUNICATION DEVICE AND CLIP

[75] Inventor: Gabriele Bundgardt, Aptos, Calif.

[73] Assignee: Plantronics, Inc., Santa Cruz, Calif.

[21] Appl. No.: 910,804

[22] Filed: Aug. 13, 1997

Related U.S. Application Data

[63] Continuation of Ser. No. 599,066, Feb. 9, 1996, abandoned.

[51] Int. Cl.$^6$ .................. H04B 1/08; H04B 1/38
[52] U.S. Cl. .................. 455/90; 455/128; 455/351; 455/575
[58] Field of Search .................. 455/575, 90, 128, 455/129, 347, 348, 349, 351; 379/428, 430

[56] References Cited

U.S. PATENT DOCUMENTS

| | | | |
|---|---|---|---|
| 3,763,434 | 10/1973 | Blesch et al. | 455/349 |
| 4,939,792 | 7/1990 | Urbish et al. | 455/347 |
| 5,016,326 | 5/1991 | Goldenberg | 24/3 J |
| 5,020,137 | 5/1991 | Barsumian | 455/347 |
| 5,086,510 | 2/1992 | Guenther et al. | 455/347 |
| 5,159,714 | 10/1992 | Cosentino et al. | 455/347 |
| 5,363,089 | 11/1994 | Goldenberg | 340/825.44 |
| 5,404,577 | 4/1995 | Zuckerman et al. | 455/66 |
| 5,414,596 | 5/1995 | Eaton et al. | 455/351 |
| 5,467,577 | 11/1995 | Furuta et al. | 455/348 |
| 5,513,383 | 4/1996 | Tsao | 455/89 |
| 5,517,683 | 5/1996 | Collet et al. | 455/89 |

FOREIGN PATENT DOCUMENTS

| | | | |
|---|---|---|---|
| 37 19 792 C1 | 8/1988 | Germany | H05K 5/02 |
| 44 29 871 A1 | 2/1996 | Germany | F16M 1/00 |
| 2 134 734 | 8/1984 | United Kingdom | H04B 1/08 |
| 2 137 038 | 9/1984 | United Kingdom | H04B 1/08 |
| 2 252 786 | 8/1992 | United Kingdom | A44B 21/00 |

*Primary Examiner*—Edward F. Urban
*Assistant Examiner*—Sam Bhattacharya
*Attorney, Agent, or Firm*—Fenwick & West LLP

[57] ABSTRACT

A communication device is disclosed having a first housing member and a second housing member, each with an inner surface. The housing members are rotatably coupled together so that the inner surface of the first housing member is biased towards the inner surface of the second housing member. Each housing member includes an electronic circuit portion that is also coupled together. In addition, the mass of the first housing member is substantially equivalent to the mass of the second housing member so that when the communication device is attached to an object, it remains balanced about the object.

5 Claims, 8 Drawing Sheets

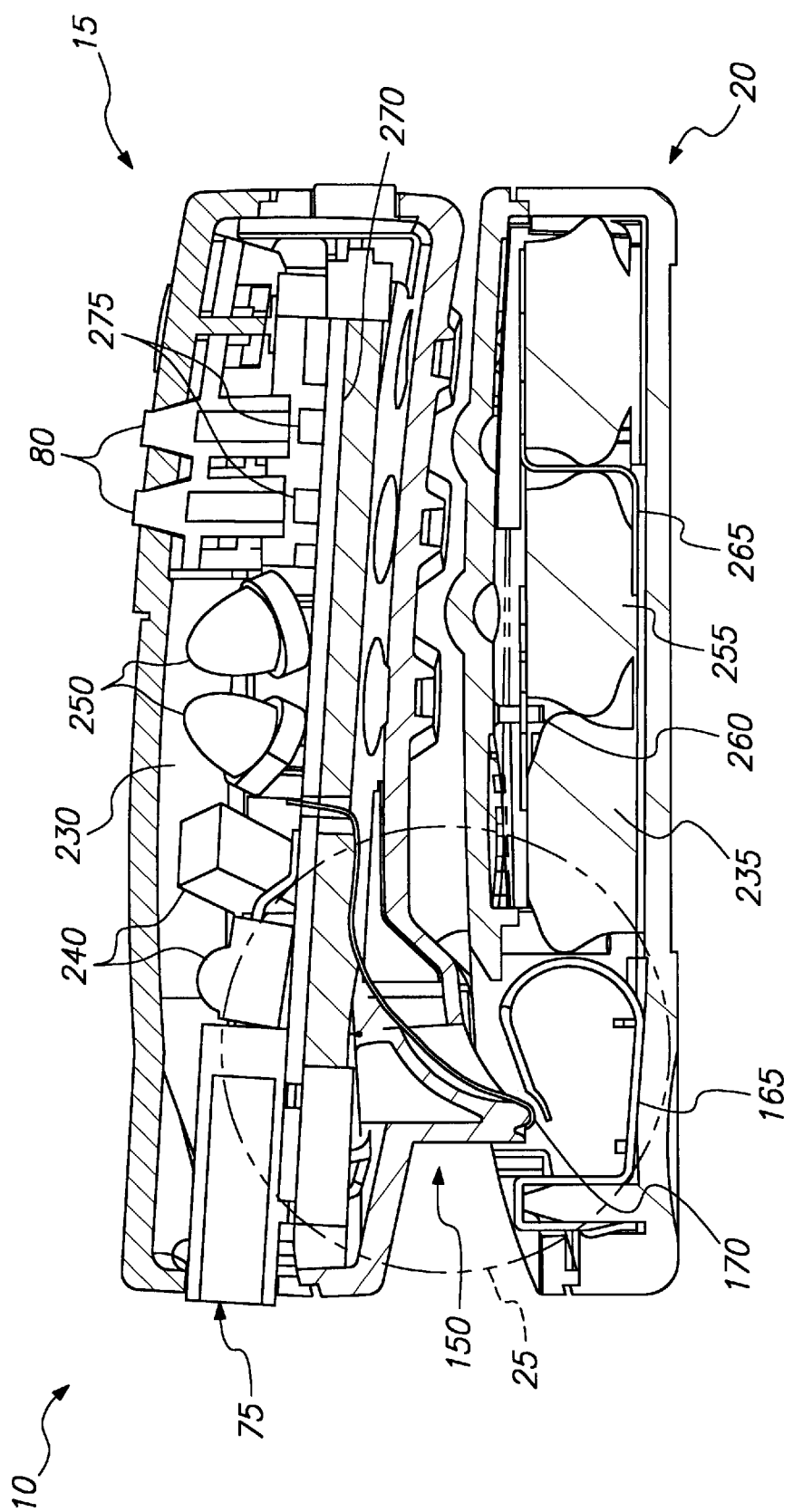

INTEGATED ELECTRONIC COMMUNICATION DEVICE AND CLIP

RELATED APPLICATIONS

This is a continuation of application Ser. No. 08/599,066 filed on Feb. 9, 1996, now abandoned.

BACKGROUND

1. Field of the Invention

This invention relates generally to the field of electronic communication devices, and more particularly, to the field of communication devices that are attached to an article of a person during use.

2. Description of the Related Art

Electronic communications devices, such as pagers, cordless telephones, pocket computers, walkie-talkies, microphones and the like, are known. In particular wireless devices are becoming increasingly widespread and diversified in their application. Over time the average size of these various communications devices has been reduced considerably as a result of improvements in integrated circuit technologies, and this size reduction further enables new product categories. One example of a new type of wireless device is communications headsets that operate with wireless remotes for use with telephones and the like. However, there has been relatively little advance in the way the electronics of these various communication devices are packaged for use by the consumer.

Conventionally, most wireless communication devices, such as pagers, walkie-talkies, radios, microphones, and even many other similar personal electronic devices, such as cassette players, and the like, are designed in packages that are either meant to be carried in the user's hand, pocket, or other enclosure, or are meant to be clipped to the user's clothing. Pagers are a typical example of this type of packaging. The typical pager is generally a rectangular prism with a tension clip mounted on one side. Similarly, wireless microphones are typically designed in a generally cylindrical body with a tension clip mounted thereon. In both cases, the device is attached to the person by clipping the device on a piece of clothing; such as a pocket, belt, or purse for the pager, or a shirt pocket or blouse for the microphone.

The clip style of packages for these electronic communication devices is not optimal, and reflects a lack of integration of the electrical design and the packaging design, and a lack of ergonomic consideration for how a user handles and interacts with such devices. In this type of packaging structure substantially all of the weight of the device, from 90% to 99%, is supported by the clipping mechanism, since it is the clip that must attach the device to the user. One problem is that the full weight of the device pulls on the user's clothing, such as shirt or blouse pocket. As a result, the device tends to dangle and move the clothing out of shape. The entire device is often unstable when the user engages in normal movement. Consequently, the user often feels uncomfortable wearing the device, or adjusts her movements so that the device remains stable.

Another problem with previous types of packaging structures, which is particularly a problem for wireless communication remotes, microphones, and similar devices, is that the entire device is visible when it is attached to the clothing from the outside, as is generally the case. Again, most consumers find it uncomfortable to wear such devices in this manner.

Accordingly, it is desirable to provide an electronic communication device packaging structure that integrates the electronics with an attachment mechanism, such as a clipping mechanism, to provide better distribution of product mass while increasing user comfort. Furthermore, it is desirable to provide an electronic communication device whose product mass is distributed substantially in equivalent proportions about the attachment mechanism to balance the device when it is worn by a user.

SUMMARY

The present invention is directed to a device that satisfies the need for an electronic communication device that is packaged to integrate an electronics component with a clipping mechanism and that is packaged to distribute the product mass of the device in substantially equivalent proportions so that the device remains balanced when attached to an object. A remote communication device includes a first housing member and a second housing member, each having an inner surface, a part of a hinge section, and a portion of an electronic circuit that provides communication functions. The first housing member is movably coupled to the second housing member at the hinge section so that the inner surface of the first housing member is biased towards the inner surface of the second housing member. In addition, the portions of the electronic circuit in each housing member are also coupled to each other, preferably through the hinge section. Moreover, the mass of the first housing member is substantially equivalent to the mass of the second housing member so that the device can remain balanced when attached to an object.

These and other features, aspects, and advantages of the present invention will become better understood with regard to the following description, appended claims, and accompanying drawings.

BRIEF DESCRIPTION OF THE DRAWINGS

FIG. 7 is an illustration of an internal center length of one embodiment of the integrated wireless device and clip;

DETAILED DESCRIPTION OF THE INVENTION

Generally, the present invention relates to a remote communications device that is an integrated wireless device and clip ("communication clip"). The communications clip is designed to clamp onto an article, such as a piece of clothing, without weighing down the article to one side because the mass is distributed almost equally on each side of the communication clip.

Figure 1:
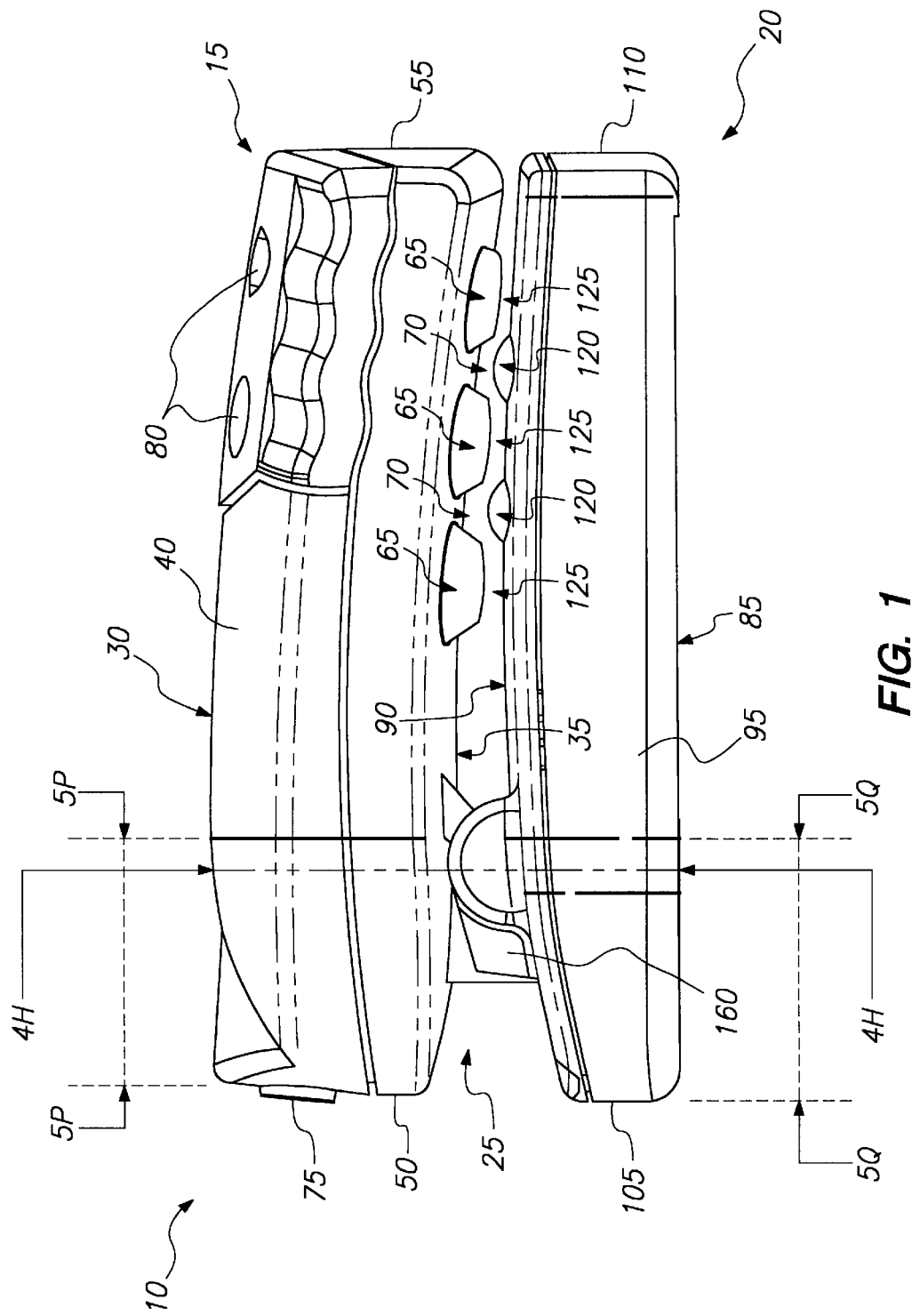
FIG. 1 is an illustration of an external structure of one embodiment of an integrated wireless device and clip from a first side view.

FIG. 1 illustrates a side view of the external structure of one embodiment of the present invention. A communication clip 10 includes a first housing member 15, a second housing member 20, and a hinge section 25. A H—H cross-section appears through a center of the hinge section 25 and is described below with respect to FIG. 4.

In this embodiment of the present invention, the first housing member 15 is a substantially enclosed structure with a hollow interior. Within the hollow interior reside selected components of the communication clip 10, as described below. These components include a first portion of an electronic circuit in the first housing member 15 that cooperates with a second portion of an electronic circuit in the second housing member 20 to facilitate communications between the communication clip 10 and existing communication systems. An exterior of the first housing member 15 includes an outer surface 30, an inner surface 35, a first side 40, a second side 45 (not shown; parallel to the first side 40), a first end 50 and a second end 55. The inner surface 35 of the first housing member 15 has a first set of protrusions 65 and a corresponding first set of indentations 70 adjacent to the first set protrusions 65.

The exterior of the first housing member 15 optionally includes a headset port 75 opening along the first end 50. The headset port 75 opening allows a user of the present invention to operate a headset, which includes a headphone and an optional microphone, with the communications clip 10 to receive and transmit communication signals. In addition, a set of buttons 80 may be disposed on the outer surface 30 and may be used to control various functions of the communication clip 10, such as volume, mute, hookswitch, and tone control. Also, the outer surface 30 of the first housing member 15 includes a P—P section that may be used to assist in a clamping operation as described below with respect to FIG. 5.

The second housing member 20 is also a substantially enclosed structure with a hollow interior. The hollow interior is where some of the other components of the communication clip 10 reside, such as the second portion of the electronic circuit. An exterior of the second housing member also has an outer surface 85, an inner surface 90, a first side 95, a second side 100 (not shown; parallel to the first side 95), a first end 105, and a second end 110. The inner surface 90 of the second housing member also includes a second set of protrusions 120 and a corresponding second set of indentations 125 adjacent to the protrusions 120. In addition, the outer surface 85 of the second housing member includes a Q—Q section that may be used to assist in the clamping operation as described below with respect to FIG. 5.

The present invention distributes the mass of the communication clip 10 such that the mass of the first housing member 15 is approximately equal to the mass of the second housing member 20. In one embodiment of the present invention, the mass is distributed substantially 50% and 50% between the first housing member 15 and the second housing member 20. The benefit of substantially equivalent mass distribution is that it allows the communication clip 10 to remain balanced about the object to which it is attached. For example, the mass distribution permits a person to wear the communication clip 10 without the discomfort or unsightly appearance that results from the pulling or the weighing down presently associated with communication devices that are meant to be attached to an article of clothing, e.g., a shirt or a blouse.

In an alternative embodiment, the mass distribution may differ by as much as 50%, so that upto 25% of apparatus mass is in one member and upto 75% of the apparatus mass is in the second member, without compromising the balance benefits achieved from substantially equivalent mass distribution. Moreover, in an alternative embodiment, the electronics of the communication clip 10 may be located within the same housing member, with a counter-balancing mass located in the opposite housing member to properly balance the communication clip 10. The alternative embodiments still realize a major benefit over current devices that still have at least 90% of their apparatus mass distributed on one side of a clip mechanism.

In this embodiment, the hinge section 25 of the present invention provides a coupling area and a pivot point for the first housing member 15 and the second housing member 20. In a preferred embodiment of the present invention, the hinge section 25 is formed by the first housing member 15 and the second housing member 20 as described below. Placing the present invention within a Cartesian coordinate system having x, y, and z axes, the z-axis would pass through the approximate center of the hinge section 25 and the first housing member 15 and the second housing member 20 would move within a y-plane parallel to the plane of the figure, while remaining in a fixed position relative to the x-plane and z-plane.

The hinge section 25 is at the inner surface 35 on the P—P section side of the first housing member 15 and at the inner surface 90 on the Q—Q section side of the second housing member 20. At an end opposite the hinge section 25 are the first and the second set of protrusions 65, 120 and indentations 70, 125. The effect of this implementation of the communication clip 10 is to create a jaw or similar structure.

The hinge section 25 is designed so that in a closed position the first housing member 15 is biased toward the second housing member 20. Generally, when the communications clip 10 is in a closed position the first set of protrusions 65 and the second set of protrusions 120 are adjacent with respect to each other. Thus, in the closed position the first set of protrusions 65 face the second set of indentations 125 and the second set of protrusions 120 face the first set of indentations 70. This implementation creates a friction area that has a gripping surface, and assists in holding the communication clip 10 in position when attached to an object, such as an article of clothing or the like. In an alternative embodiment, only one surface inner has the set of protrusions and the other surface has the indentations.

When the communication clip 10 is prepared for attachment to an object, such as a blouse or a shirt, the jaw is first placed in an open position. The open position involves rotating the first housing member 15 and second housing member 20 about the hinge section 25 as described below. The rotation occurs along the z-axis through the approximate center of the hinge section 25.

The first housing member 15 and the second housing member 20 are constructed of a durable, yet lightweight, material such as a plastic or plastic composite. In one embodiment of the present invention, the plastic composite is a clear polycarbonate that permits infrared light to enter through the outer surface 30, 85 of the housing members having an infrared technology implementation of an electrical communication circuit. In alternative embodiments the first housing member 15 and the second housing member 20 may also be constructed of a polycarbonate blend, polyethylene, a metallic composite, or other durable, yet lightweight, material such as ABS (acrylonitrile-butadiene-styrene).

Figure 2:
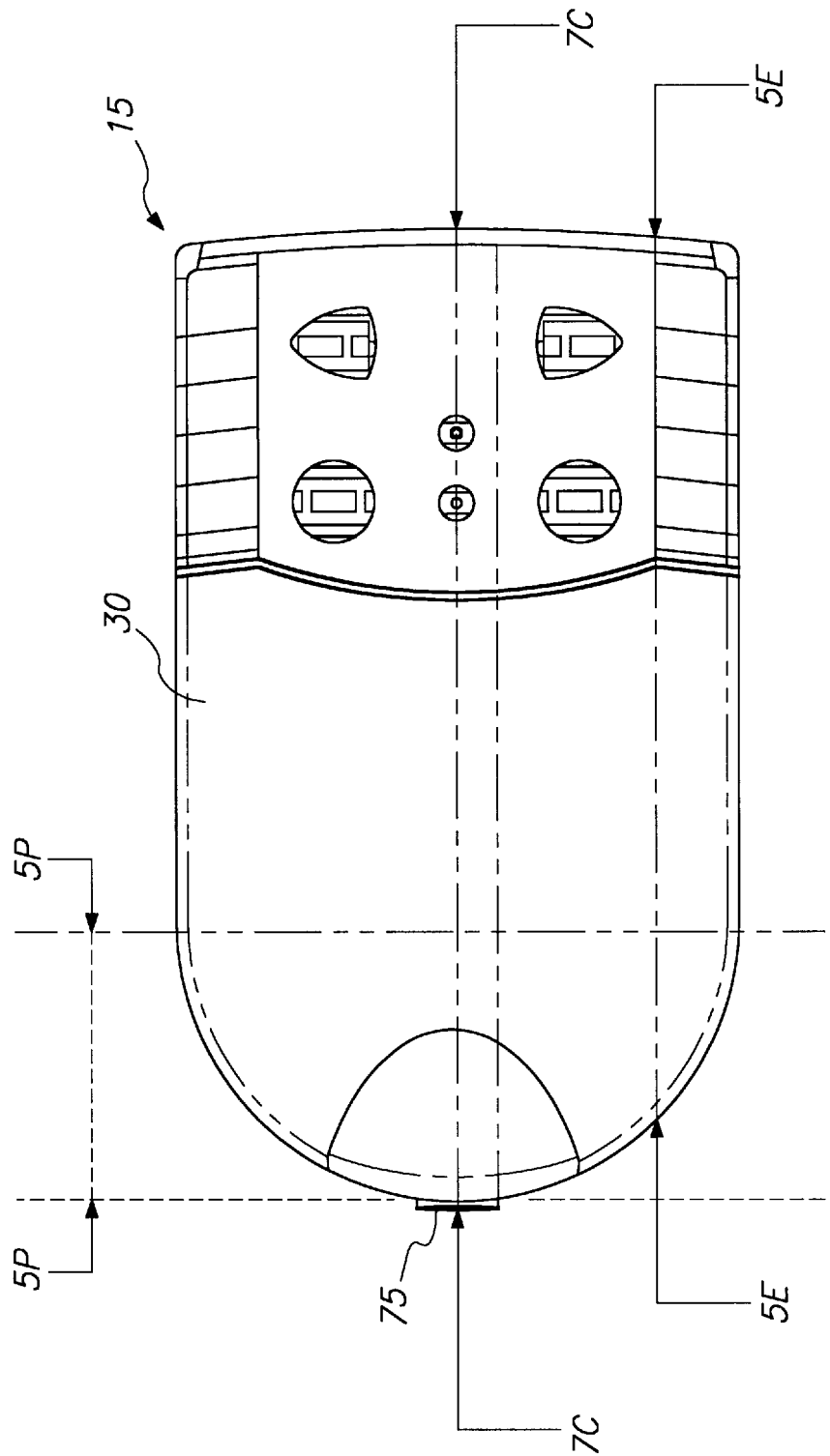
FIG. 2 is an illustration of an external structure of one embodiment of the integrated wireless device and clip from an outer surface view.

FIG. 2 shows the outer surface 30 of the first housing member 15 of the communication clip 10. A headset port 75 is located on the top side 50 of the communication clip 10. The set of buttons 80, which are used to control various functions of the communication clip 10, are located towards the second end 55 of the first housing member 15. Along the outer surface 30 of the first housing member is the P—P section that may be used to assist in a clamping operation as described below with respect to FIG. 5. The figure also shows a center length, marked as a C—C cross section, and an edge length, marked as an E—E cross section, of the communication clip 10.

Figure 3A:
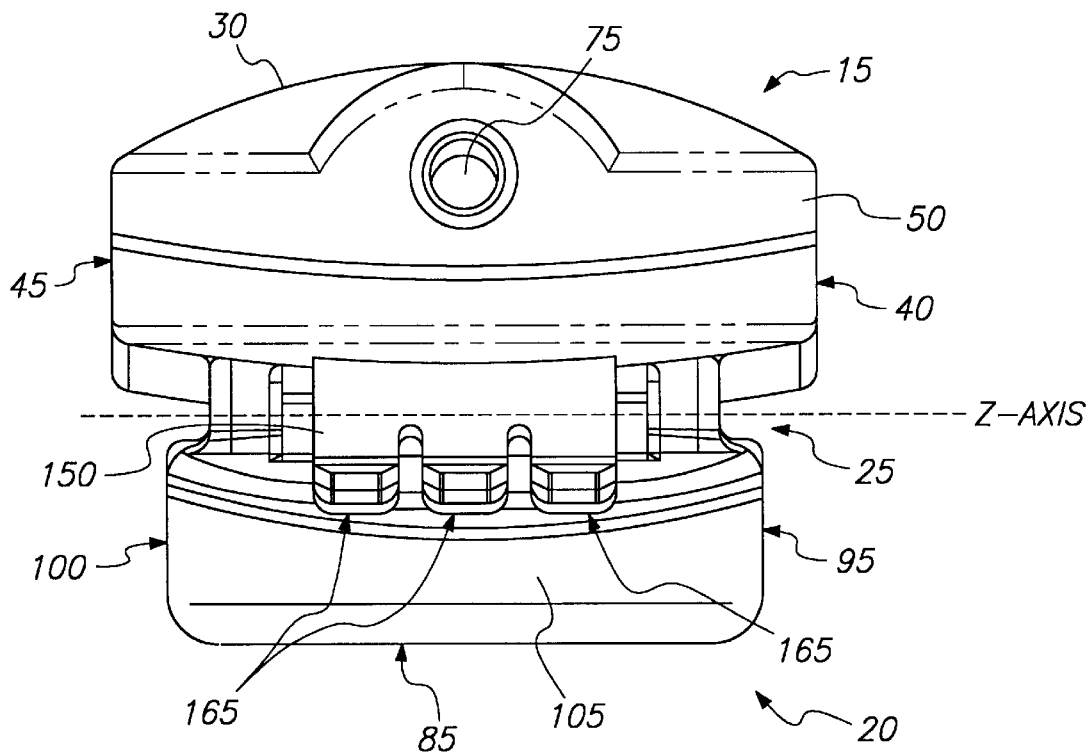
FIG. 3A is an illustration of an external structure of one embodiment of the integrated wireless device and clip from a first end view.

FIG. 3A shows an external embodiment of the present invention from the first end 50, 105. The headset port 75 in the first housing member 15 where a headset, including a headphone and an optional microphone, communicates with the communication clip 10 to transfer, i.e., transmit and receive, a set of communication signals. In addition, the hinge section 25 includes a first housing extension 150 and three tension springs 165 that are partially shown. The first housing extension 150 is formed from the first housing member 15, while the tension springs 165 are recessed within the second housing member 20. Moreover, the tension springs 165 may be comprised of one or more tension springs.

Figure 3B:
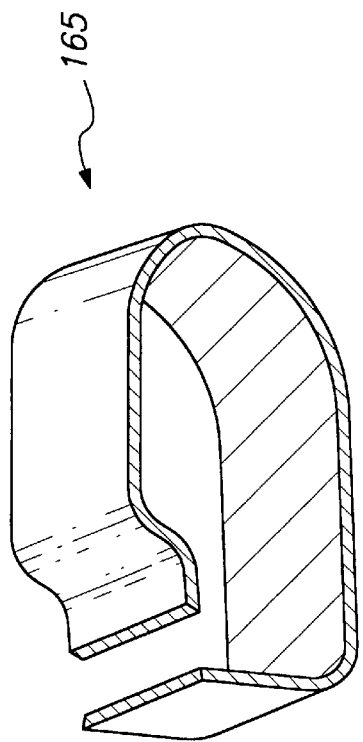
FIG. 3B is an illustration of a tension spring of one embodiment of the integrated wireless device and clip.

FIG. 3B shows one embodiment of a tension spring 165 that would be located within the second housing member 20. Generally, when the communication clip 10 is in the closed position the tension spring 165 assumes a rigid position as illustrated for example.

Figure 4:
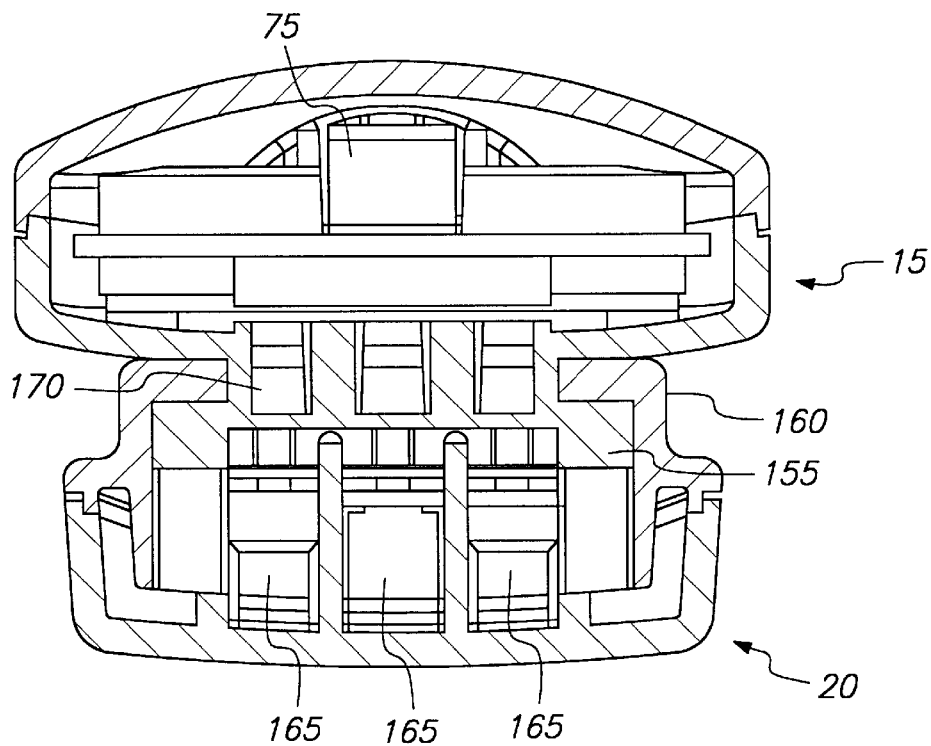
FIG. 4 is an illustration of a cross-section view of one embodiment of a hinge section from the first end of the integrated wireless device and clip.

FIG. 4 illustrates the hinge section 25 from the H—H cross-section of FIG. 1. In one embodiment of the present invention, a first segment of the first housing member 15 rests on top of a hinge notch 160 that are a part of and located on both the first side 95 and the second side 100 of the second housing member 20. The first housing extension 150 includes an end knob 155 on each end. Each end knob 155 fits within each hinge notch 160 to rotatably couple the first housing member 15 to the second housing member 20. The first housing extension 150 also includes a set of three spring contacts 170 that sit on the set of three tension springs 165 that rest within the second housing member 20. The first housing extension 150 runs along the width of the inside of the second housing member 20 from the first side 95 to the second side 100.

Figure 5:
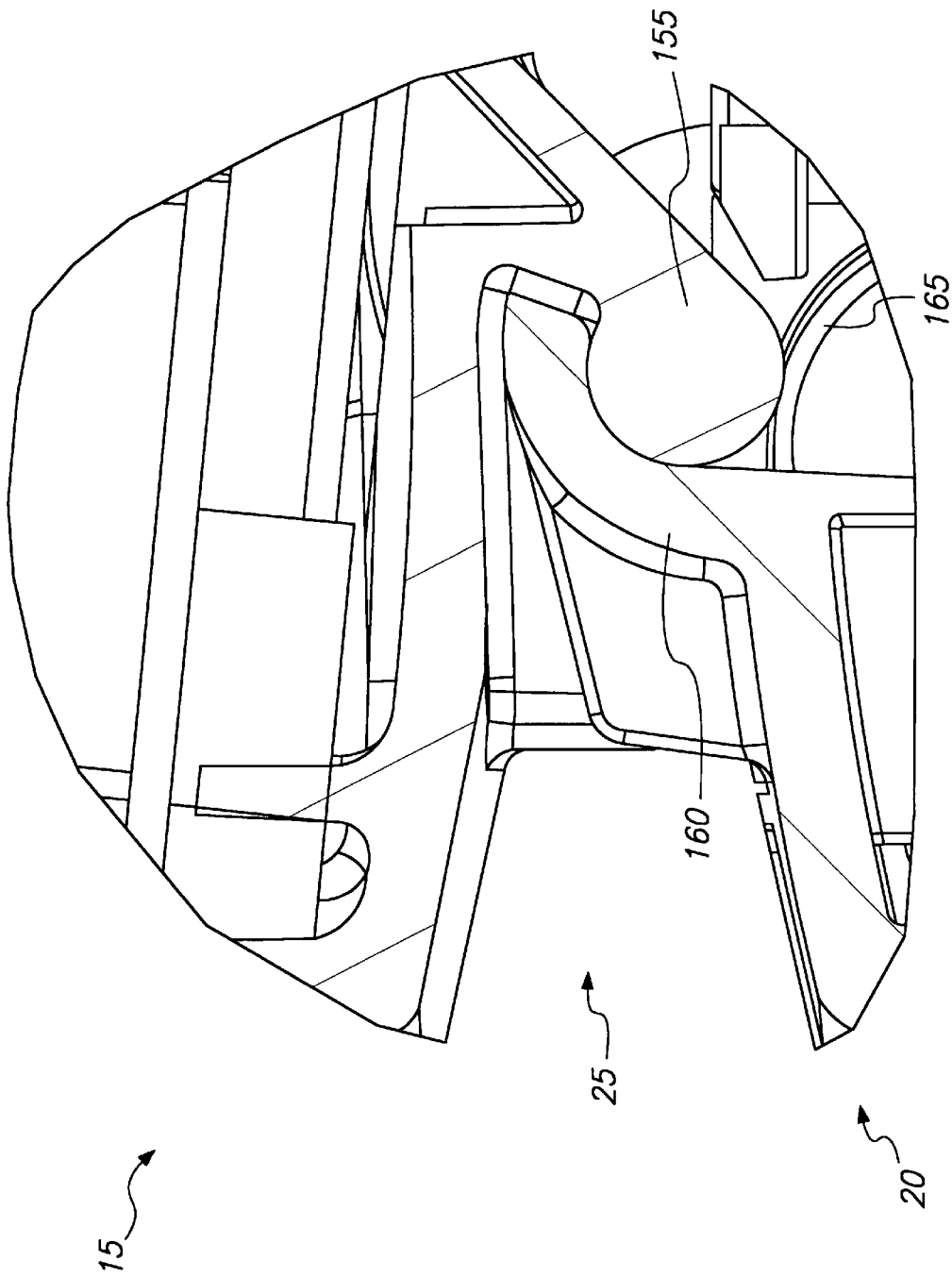
FIG. 5 is an illustration of an internal view of one embodiment of the hinge section near an edge of the integrated wireless device and clip from a first length side view position.

Referring now to FIG. 5, a close-up internal sectional view of the hinge section 25, shown from the H—H section of FIG. 1 and the E—E cross-section of FIG. 2, illustrates an embodiment of the present invention where the hinge section 25 is constructed from the first housing member 15 and the second housing member 20. The first housing member 15 includes the first housing extension 150 that rests on the spring elements 165 located within the second housing member 20. The second housing member 20 includes the hinge notch 160 where the end knob 155 of the first housing extension 150 is coupled.

One way rotation about the hinge section 25 is achieved is by simultaneously pressing on the P—P section of the first housing member 15 and the Q—Q section of the second housing member 20, both sections as shown in FIG. 1, towards each other so that the force applied is exerted in the direction of the hinge section 25. Once the communication clip 10 is in the open position and placed by a location where it will be attached, the jaw is closed by releasing the pressure on the P—P section or the Q—Q section so that when the communication clip 10 is attached to the object, the first housing member 15 is once more biased toward second housing member 20.

During one operation of the hinge section 25, when the P—P section of the first housing member 15 and the Q—Q section of the second housing member 20 are simultaneously depressed towards each other, the end knob 155 rotates within the hinge notch 160 in a counterclockwise direction, pushing the first housing extension 150 against the tension spring 165. This motion releases the tension spring 165 from the rigid position and creates a tension in the tension spring 165, as the jaws of the communication clip 10 open. When the pressure is released from the P—P section or the Q—Q section the end knob 155 rotates within the hinge notch 160 in a clockwise direction. This motion releases the tension in the tension spring 165 to return the tension spring 165 back to its original rigid position so that the jaws of the communication clip 10 close and the first housing member 15 is once more biased towards the second housing member 20.

In an alternative embodiment, the hinge section 25 is formed by a separate structure that attaches to the first housing member 15 and the second housing member 20. In addition, the hinge section 25 may be constructed from a spherical or curved surface, such as ball bearings, or from a resilient structure, such as a spring. Moreover, in an alternative embodiment of the present invention the hinge clip member 25 permits rotation in the z-axis direction as well as the x-axis direction and y-axis direction.

Figure 6:
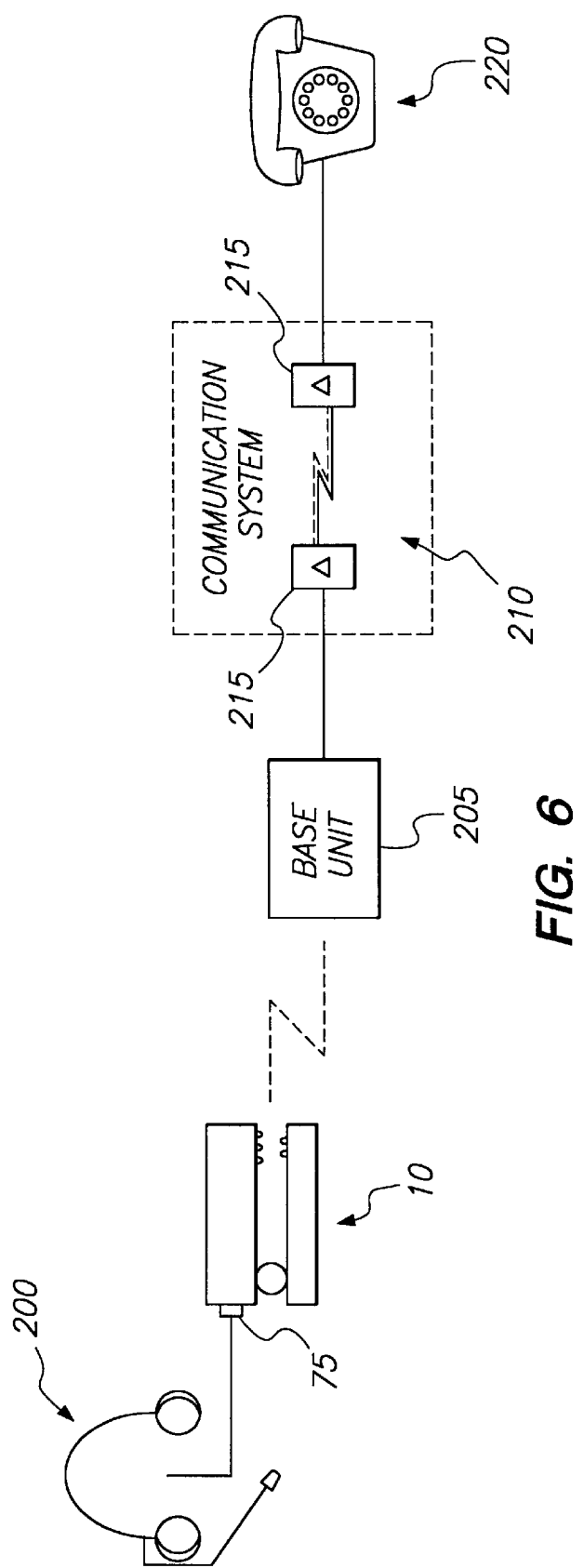
FIG. 6 is an illustration of one embodiment of a system in which the integrated wireless device and clip operates.

Turning now to FIG. 6, a block diagram illustrates one example of a telecommunications environment in which the communication clip 10 operates, to establish a communications connection or link. A base unit 205, which is a type of telecommunications device, is remote from the communication clip 10 and transfers, i.e., either receives or transmits, a set of communication signals between the communication clip 10 and a telecommunications device or medium, such as a telephone system 210. A headset 200, having a headphone and an optional microphone, communicates with the communication clip 10 through the headset port 75 to transfer the set of communication signals. The telephone system 210 has a communication interface 215 to which the base unit 205 connects to allow the base unit 205 to communicate across the telephone system 210 to other telecommunication devices, such as a telephone 220. The communications signals may be transferred between the communication clip 10 and the base unit 205 using an infrared technology implementation, a radio frequency (RF) implementation, or other electrical communication circuit implementation, that uses an analog or a digital communications protocol.

In an alternative embodiment the communication clip 10 may also be operated as a stand-alone communication device without having a base unit as an intermediary. The communication clip may also be designed to communicate directly with other communication devices or mediums, including personal computers, radio transmitters, facsimile machines, pagers, and cellular telecommunication systems.

FIG. 7 depicts the communication clip 10 in one embodiment having an infrared technology implementation as seen from the first side 40 position at the C—C cross-section shown in FIG. 2. The interior of the first housing member 15 contains a first portion of an electronic circuit, such as an electrical communications circuit 230. The electrical communications circuit 230 transfers, i.e., either receives or transmits, the set of communication signals. In an infrared technology implementation, the electrical communications circuit 230 operates to communicate using infrared signals and uses infrared technology components that include infrared detectors 240 and infrared emitter diodes 250.

The interior of the second housing member 20 contains a second portion of an electronic circuit, such as a power source circuit 235. The power source circuit 235 provides power to operate the electrical communications circuit 230 of the communication clip 10. The power source circuit 235 includes a battery cell 255. In one embodiment, the battery cell 255 is a rechargeable battery, such as a nickel cadmium ("NiCad"), nickel-metal hydride, or the like that can be recharged while remaining in the communication clip 10, in a base unit, or separately. A battery electrical contact 265 connects the battery cell 255 with the rest of the power source circuit 235. A battery locating pin 260 serves to hold the battery in place within the second housing member 20.

An alternative embodiment of the present invention can also use other types of rechargeable battery cells, as well as generally available primary battery cells or other non-rechargeable battery cells such as alkaline battery cells. Moreover, power source circuit 235 of the present invention may include an AC-DC adapter implementation to serve as a power source that may be plugged into an alternating current power source.

When the communication clip 10 is operational, the power source circuit 235 powers the electrical communications circuit 230 from the battery cell 255. Power from the battery cell 255 is transferred through the battery electrical contact 265 to at least one of the tension springs 165. The tension springs 165 serve as an electrical conduit as well as the tension element for the clamping operation described above. The power then transfers from the tension springs 165 to spring contact 170 that also serves as an electrical conduit and that is located in the hinge section 25 area. The spring contact 170 connects to a printed circuit board 270 of the electrical communications circuit 230 to drive the operation of the communication clip 10.

In an alternative embodiment, the electrical communications circuit 230 and the power source circuit 235 would be distributed such that a first portion of a electrical communications circuit would reside in the first housing member 15 and a second portion of the communications circuit would reside in the second housing member 20. Likewise, a first portion of a power source circuit would reside in the first housing member 15 and a second portion of the power source circuit would reside in the second housing member 20. In yet another embodiment of the present invention, both the electrical communications circuit 230 and the power source circuit 235 may reside in the same housing member while a counter-balancing mass resides in the other housing member. The benefit of these alternative embodiments is the substantially equivalent mass distribution that results from the placement of the electrical circuits 230, 235 between the first housing member 10 and the second housing member 20.

Figure 8:
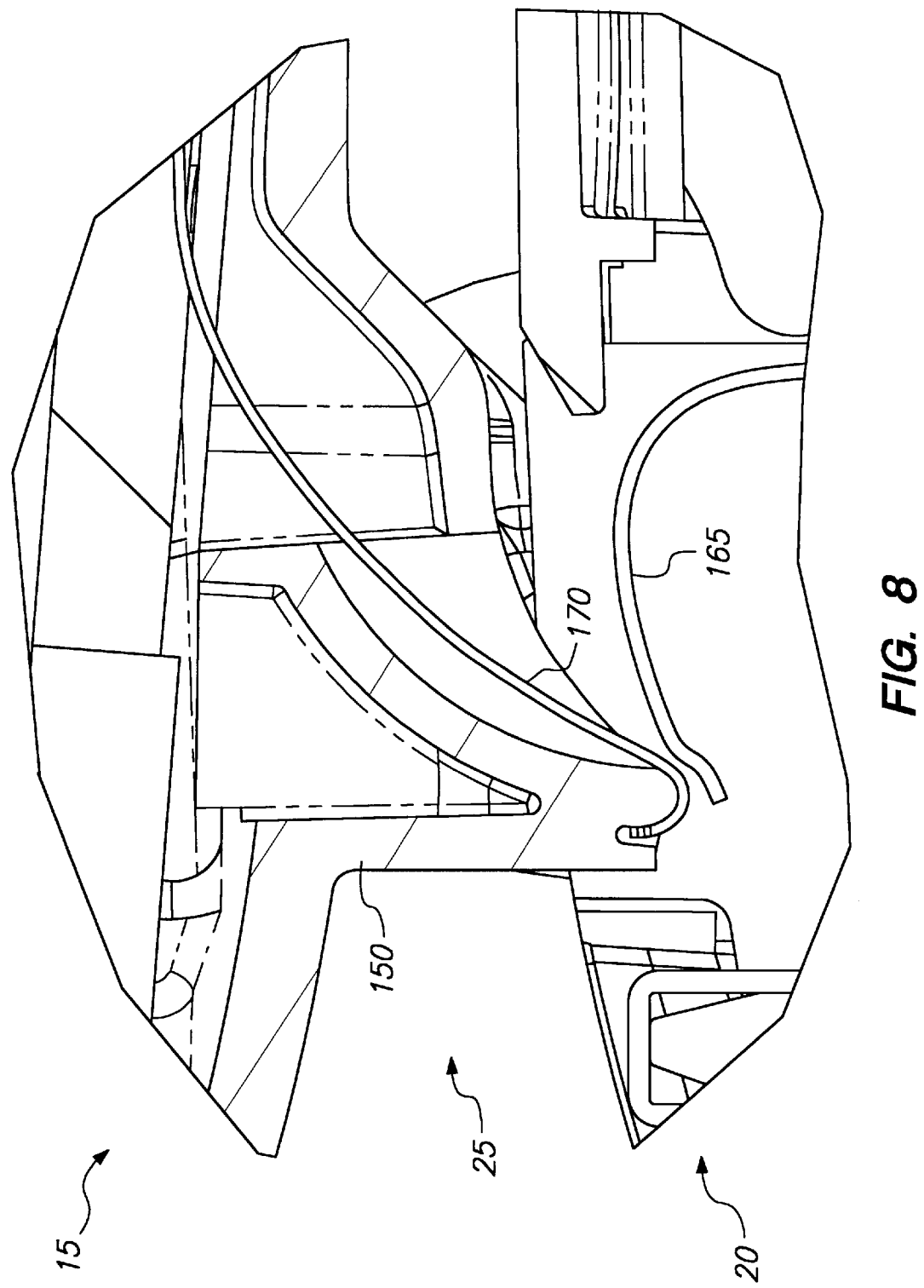
FIG. 8 is an illustration of an internal section of the hinge section at the internal center length view of the integrated wireless device and clip; and, FIG. 9 is block diagram of one embodiment of a radio frequency communication architecture of the integrated wireless device and clip.

Referring now to FIG. 8, a close-up internal sectional view of the hinge section 25 as seen from along the center of the communication clip 10, illustrates the first housing extension 150, the tension spring 165 and the spring contact 170. The spring contact 170 is coupled to the first housing extension 150 and contacts with the tension spring 165.

When the communication clip 10 is operational the contact between the tension spring 165, and the spring contact 170 conducts power generated from the power source circuit 235 to the printed circuit board 270 of the electrical communications circuit 230.

In an alternative embodiment of the present invention, the electrical communications circuit 230 and the power source circuit 235 may be coupled through a lead or other connection circuit. The electrical lead circuit may be a single or multiple element electrical structure that functions to supply power to the electrical communications circuit 230 from the power generated in the power source circuit 235.

Figure 9:
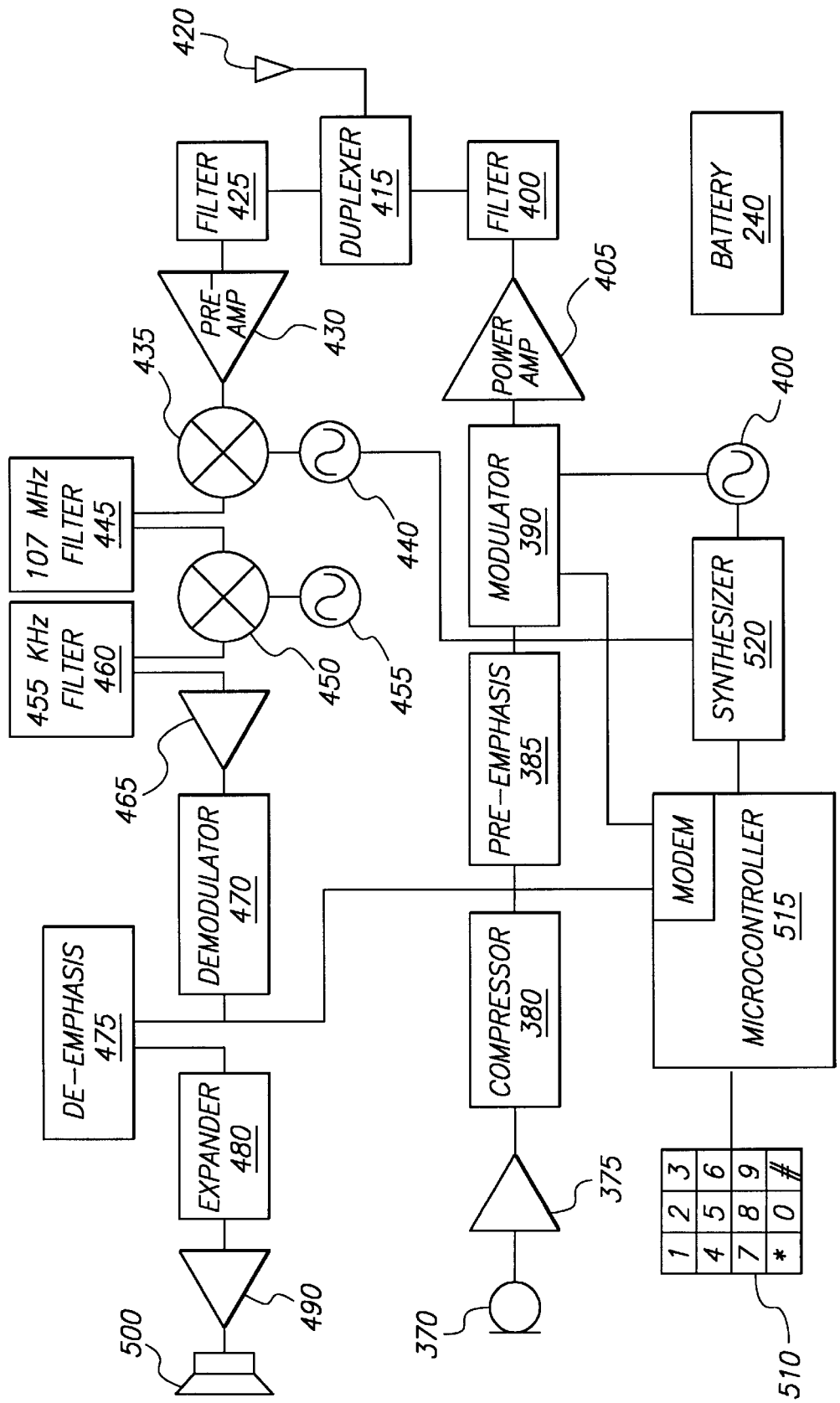

FIG. 9 is a block diagram that illustrates one embodiment of the electrical communications circuit 230 of the communication clip 10 using a conventional FM modulated double superheterodyne RF circuit that is described in many electrical communications text books. The communication clip 10 uses this RF implementation to transfer, i.e., transmit and receive, a communication signal, including an audio signal or portion, to and from a telecommunications device.

Generally, during a transmission, the communication signal is sent through a microphone 370, modulated in a modulator 390, and amplified in a power amplifier 405 to generate an amplitude modulated signal. The amplitude modulated signal is filtered through a filter 410 and ultimately transmitted through an antenna 420.

Generally, during a receive, the RF communication signal is received by the antenna 420, tuned through a mixer 435, having a tunable oscillator 440, filtered through a filter 445 and once more sent through a mixer 450, having a local tunable oscillator 455. The signal is then demodulated in a demodulator 470, amplified by amplifier 490 and heard through a speaker 500.

In the RF implementation, the antenna 420 of the communication clip 10 may be internal for high frequency communication or external for low frequency communication.

In an alternative embodiment of the RF implementation, the electrical communications circuit 230 of the communication clip 10 may also be equipped with a keypad 510 to allow alpha-numerical manipulation, including dialing phone numbers, to occur directly from the communication clip 10. In one embodiment, the keypad 510 is a 12 button keypad on which an alpha-numerical combination, such as a phone number, is entered.

In an alternative embodiment, the electrical communications circuit 230 is an infrared (IR) technology communication circuit.

Similar to the RF embodiment, the IR technology implementation of the electrical communications circuit 230 may also be equipped with a keypad for alpha-numerical manipulation, including dialing phone numbers. Also, the RF and the IR implementation of the electrical communication circuit 230 may be implemented using an analog communication or a digital communication protocol for transferring communication signals.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A voice communication system, comprising:

a headset for receiving and transmitting voice signals; and a communication clip, including a headset port for electrically coupling the headset to a communication circuit, the communication clip further comprising:

a first housing member substantially encasing a first portion of the communication circuit, the first housing member having a first mass, a first inner surface having a first end and a second end, and a first part of a hinge section located proximate to the first end of the first inner surface, the communication circuit for wirelessly transferring voice signals between the headset and a telecommunication system; and a second housing member substantially encasing a second portion of the communication circuit coupled to the first portion of the electronic circuit, the second housing member having a second mass substantially equivalent to the first mass, a second inner surface having a first end and a second end, and a second part of the hinge section located proximate to the first end of the second inner surface, the second part of the hinge section movably coupled to the first part of the hinge section for the second end of the first inner surface and the second end of the second inner surface to releasably grasp an object between the first inner surface and the second inner surface during operation of the communication clip.

2. The voice communication system of claim 1, further comprising a base unit for coupling to the telecommunication system, the base unit remotely coupled to the communication clip for transferring the voice signals between the telecommunication system and the communication clip.

3. The voice communication system of claim 1, wherein the second portion of the communication circuit of the communication clip includes an electrical power source circuit for providing power to the communication circuit of the communication clip.

4. The voice communication system of claim 1, the communication clip further comprising a tension spring located between the first and the second housing members and coupling the first portion of the communication circuit to the second portion of the communication circuit for transmitting electrical signals therebetween and for urging the first housing member toward the second housing member to releasably grasp an object between the first inner surface and the second inner surface.

5. The voice communication system of claim 1, wherein communication clip further comprises having a difference between the first mass and the second mass of the communication clip no greater than fifty percent.

* * * * *

UNITED STATES PATENT AND TRADEMARK OFFICE
CERTIFICATE OF CORRECTION

PATENT NO.: 5,835,852

DATED: November 10, 1998

INVENTOR(S): Gabriele Bundgardt

It is certified that error appears in the above-identified patent and that said Letters Patent is hereby corrected as shown below:

Title page, under title, replace "INTEGATED" with --INTEGRATED--.

Column 1, line 1, replace "INTEGATED" with --INTEGRATED--.

Signed and Sealed this

Ninth Day of March, 1999

*Attest:*

Q. TODD DICKINSON

*Attesting Officer*  Acting Commissioner of Patents and Trademarks

UNITED STATES PATENT AND TRADEMARK OFFICE
CERTIFICATE OF CORRECTION

PATENT NO. : 5,835,852
DATED : November 10, 1998
INVENTOR(S) : Gabriele Bungardt It is certified that error appears in the above-identified patent and that said Letters Patent is hereby corrected as shown below:

On the title page, under item [19] and item [75], delete "Bundgardt" and insert --Bungardt--.

Signed and Sealed this

Thirty-first Day of August, 1999

Attest:

Q. TODD DICKINSON

*Attesting Officer*     *Acting Commissioner of Patents and Trademarks*